United States Patent
Kim et al.

(10) Patent No.: US 11,182,245 B2
(45) Date of Patent: Nov. 23, 2021

(54) OPERATING METHOD OF MEMORY CONTROLLER, MEMORY CONTROLLER, AND STORAGE DEVICE

(71) Applicant: SAMSUNG ELECTRONICS CO., LTD., Suwon-si (KR)

(72) Inventors: Bo Mi Kim, Hwaseong-si (KR); Dong Gun Kim, Hwaseong-si (KR); Soo Hyun Kim, Cheongju-si (KR); Ki Hyun Choi, Hwaseong-si (KR); Pil Chang Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/857,358

(22) Filed: Apr. 24, 2020

(65) Prior Publication Data
US 2021/0055988 A1 Feb. 25, 2021

(30) Foreign Application Priority Data
Aug. 20, 2019 (KR) .......................... 10-2019-0101481

(51) Int. Cl.
*G06F 11/00* (2006.01)
*G06F 11/10* (2006.01)
*G06F 9/4401* (2018.01)

(52) U.S. Cl.
CPC ........ *G06F 11/1068* (2013.01); *G06F 9/4401* (2013.01)

(58) Field of Classification Search
None
See application file for complete search history.

(56) References Cited

U.S. PATENT DOCUMENTS

| 6,212,631 | B1 | 4/2001 | Springer et al. |
| 7,827,468 | B2 | 11/2010 | Kato et al. |
| 7,984,363 | B2 | 7/2011 | Kushida |
| 9,575,835 | B2 | 2/2017 | Vogelsang et al. |
| 9,612,904 | B2 | 4/2017 | Gueta et al. |
| 9,852,023 | B2 | 12/2017 | Tsutsui |

(Continued)

FOREIGN PATENT DOCUMENTS

JP 2005-044427 A 2/2005

OTHER PUBLICATIONS

D. Kim, Y. Won, J. Cha, S. Yoon, J. Choi and S. Kang, "Exploiting Compression-Induced Internal Fragmentation for Power-Off Recovery in SSD," in IEEE Transactions on Computers, vol. 65, No. 6, pp. 1720-1733, Jun. 1, 2016, doi: 10.1109/TC.2015.2462819. (Year: 2016).*

(Continued)

*Primary Examiner* — Daniel F. McMahon
(74) *Attorney, Agent, or Firm* — Sughrue Mion, PLLC

(57) ABSTRACT

An operating method of a memory controller to update metadata using journaling data in a short time during a booting operation, and to maintain reliability of the updated metadata. The operating method of a memory controller includes loading metadata into sub-regions of a buffer memory, updating the metadata using journaling data in a state that error correction code (ECC) functions of memory controller for the sub-regions are disabled, generating a first parity data of data stored in the first sub-region, and enabling the ECC function of the first sub-region, after the first parity data is generated.

19 Claims, 10 Drawing Sheets

(56) References Cited

U.S. PATENT DOCUMENTS

| | | | |
|---|---|---|---|
| 2006/0117239 A1* | 6/2006 | Lin | G11B 20/00 |
| | | | 714/758 |
| 2008/0266336 A1* | 10/2008 | Maru | B41J 2/17566 |
| | | | 347/7 |
| 2014/0115232 A1* | 4/2014 | Goss | G06F 11/1471 |
| | | | 711/103 |
| 2015/0261617 A1* | 9/2015 | Choi | G11C 11/5642 |
| | | | 714/6.22 |
| 2019/0138389 A1 | 5/2019 | Kawanishi et al. | |
| 2019/0146870 A1 | 5/2019 | Cha et al. | |
| 2019/0146911 A1* | 5/2019 | Ha | G06F 12/0246 |
| | | | 711/103 |
| 2019/0303226 A1* | 10/2019 | Kim | G06F 12/0804 |
| 2020/0117389 A1* | 4/2020 | Kang | G06F 3/0644 |
| 2020/0241955 A1* | 7/2020 | Jun | G06F 11/10 |

OTHER PUBLICATIONS

Communication dated Oct. 23, 2020, issued by the European Patent Office in European Application No. 20172057.0.

\* cited by examiner

OPERATING METHOD OF MEMORY CONTROLLER, MEMORY CONTROLLER, AND STORAGE DEVICE

CROSS-REFERENCE TO RELATED APPLICATION

This application claims priority from Korean Patent Application No. 10-2019-0101481 filed on Aug. 20, 2019, in the Korean Intellectual Property Office, the contents of which are herein incorporated by reference.

BACKGROUND

1. Technical Field

The disclosure relates to a memory controller, a method of operating the memory controller, and a storage device coupled to the memory controller.

2. Description of the Related Art

A flash memory is a nonvolatile memory that can retain stored data even when supply of power thereto is interrupted. Recently, storage devices including a flash memory such as an embedded multimedia card (eMMC), a universal flash storage (UFS), a solid state drive (SSD) and a memory card have been widely implemented for many applications, including storing or moving large amounts of data.

Meanwhile, in some SSD products, there is a requirement for an open time when a sudden power off (SPO) occurs. For example, when the SPO occurs, during a booting operation, the SSD product must load metadata stored in a main memory (e.g., NAND memory) to a buffer memory (e.g., DRAM) within the open time, and update the metadata using journaling data.

However, as the capacity of the SSD product increases, the size of the metadata/journaling data also increases. Thus, it becomes difficult to update the metadata within the predetermined open time.

In addition, some SSD products provide an error correction code (ECC) function into the buffer memory to improve reliability. When using the ECC function, the time required to write to the buffer memory increases. Therefore, it becomes even more difficult to update the metadata within the predetermined open time.

SUMMARY

Aspects of the disclosure provide a method of operating a memory controller to update metadata using journaling data in a short period time appropriate for a booting operation, and to maintain reliability of the updated metadata.

Aspects of the disclosure also provide a memory controller to update metadata using journaling data in a short period of time during a booting operation, and to maintain reliability of the updated metadata.

Aspects of the disclosure also provide a storage device including the memory controller.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of the disclosure, there is provided a method of operating a memory controller including loading metadata into a plurality of sub-regions of a buffer memory, updating the metadata using journaling data in a state that an error correction code (ECC) function of the memory controller is disabled for each of the plurality of sub-regions, generating a first parity data of data stored in a first sub-region among the plurality of sub-regions, and enabling the ECC function of the first sub-region, after generating the first parity data.

According to an aspect of the disclosure, there is provided a method of operating a memory controller including loading metadata into a plurality of sub-regions of a buffer memory during an open time of sudden power off (SPO) of the buffer memory, updating the metadata using journaling data in a state that an error correction code (ECC) function of the memory controller is disabled for each of the plurality of sub-regions, and after the open time of the SPO, as a background operation, generating parity data of data respectively stored in the plurality of sub-regions in an order of the plurality of sub-regions arranged in the buffer memory.

According to an aspect of the disclosure, there is provided a memory controller which controls a buffer memory including a journal controller configured to load metadata into a plurality of sub-regions of the buffer memory and update the metadata using journaling data, an error correction code (ECC) controller configured to selectively enable and disable an ECC function of the memory controller for each of the plurality of sub-regions, and a parity data generator configured to generate parity data for data stored in each sub-region of the plurality of sub-regions, wherein while the journal controller updates the metadata using the journaling data, the ECC controller is configured to disable the ECC function for all sub-regions of the plurality of sub-regions, and the ECC controller is configured to enable the ECC function only for processed sub-regions among the plurality of sub-regions for which the parity data has been generated by the parity data generator.

According to an aspect of the disclosure, there is provided a storage device including a main memory, a buffer memory including a plurality of sub-regions, and a memory controller configured to load metadata stored in the main memory into the plurality of sub-regions of the buffer memory after a sudden power off (SPO) of the buffer memory occurs, and update the metadata using a journaling data according to whether an ECC function of the memory controller for each of the plurality of sub-regions was selectively enabled or disabled by the memory controller upon the SPO of the buffer memory.

BRIEF DESCRIPTION OF THE DRAWINGS

The above and other aspects and features of the disclosure will become more apparent by describing in detail exemplary embodiments thereof with reference to the attached drawings, in which:

FIG. 6 is a diagram explaining a replay operation in a state that the ECC function is turned on;

DETAILED DESCRIPTION OF THE EMBODIMENTS

Hereinafter, various embodiments of the disclosure will be described with reference to the accompanying drawings.

Figure 1:
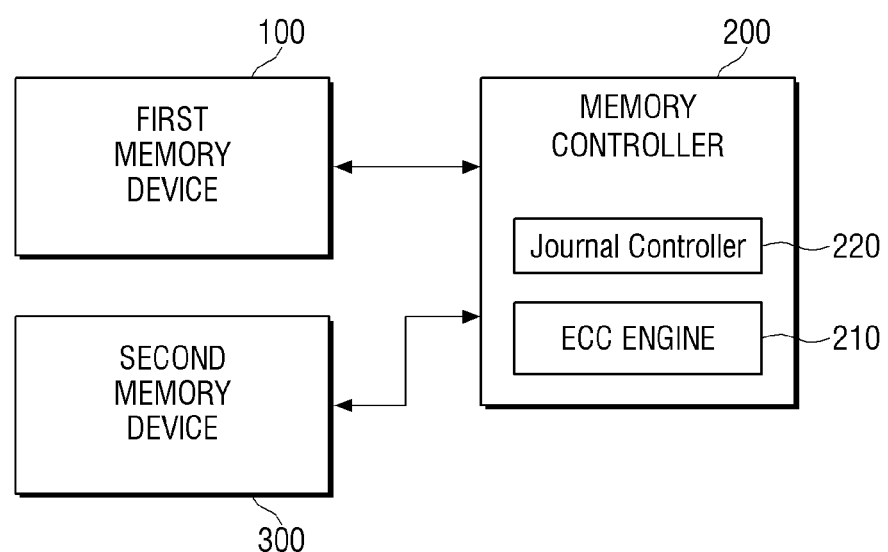
FIG. 1 is a block diagram illustrating a storage device according to an embodiment of the disclosure.
Figure 2:
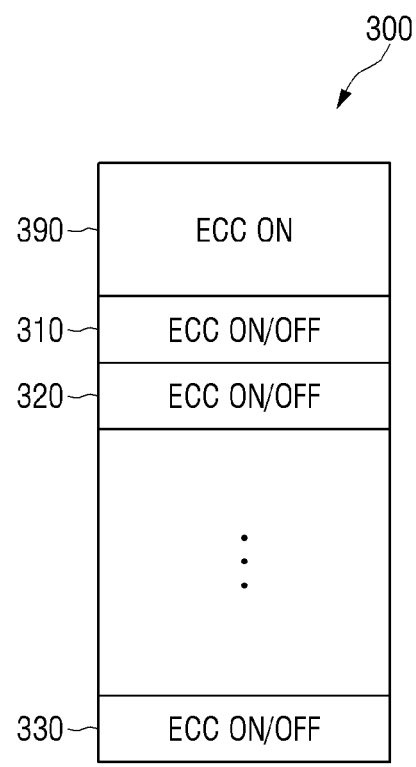
FIG. 2 is a conceptual diagram illustrating a second memory device of FIG. 1.
Figure 3:
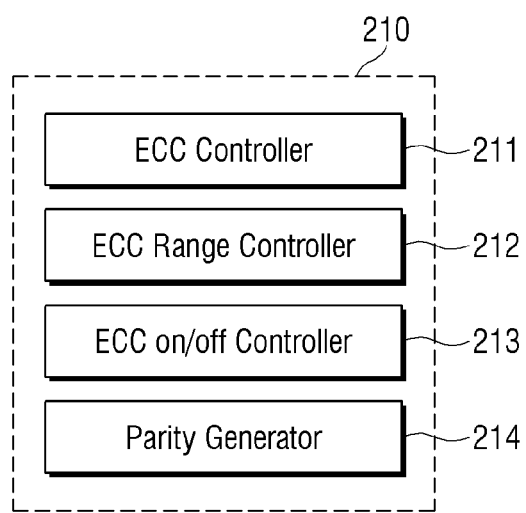
FIG. 3 is a block diagram illustrating an ECC engine of FIG. 1.

FIG. 1 is a block diagram illustrating a storage device according to an embodiment of the disclosure. FIG. 2 is a conceptual diagram illustrating a second memory device of FIG. 1. FIG. 3 is a block diagram illustrating an ECC engine of FIG. 1.

First, referring to FIG. 1, a storage device according to an embodiment of the disclosure includes a first memory device 100, a second memory device 300 and a memory controller 200. The first memory device 100 and the second memory device 300 are exemplary, and the storage device may include additional memory beyond the first memory device 100 and the second memory device 300.

The storage device may be implemented as, but is not limited to, a smart card, a secure digital (SD) card, a multimedia card (MMC), an embedded MMC (eMMC), an embedded multi-chip package (eMCP), a perfect page NAND (PPN), a universal flash storage (UFS), a universal serial bus (USB) flash drive, a solid state drive (SSD), or an embedded SSD (eSSD).

The memory controller 200 controls the operation of the first memory device 100 and the second memory device 300. The memory controller 200 may include at least one microprocessor, central processing unit, or other control unit configured to control operations of the memory controller. The memory controller may be configured according to a hardware configuration or a software configuration upon execution of computer-executable codes stored in the memory controller 200 for controlling operations thereof. The memory controller 200 may analyze a command provided from a host to which the storage device is connected, and control operations of the first memory device 100 and the second memory device 300 according to the analysis result. The host may include any electronic device for storing data in the storage device and accessing the data stored in the storage device, such as a personal computer, cellular telephone, television, consumer electronic appliance, etc.

The first memory device 100 may be a main memory, for example, a device based on a nonvolatile memory (e.g., a NAND flash memory), but is not limited thereto. The first memory device 100 includes a user data area in which user data is stored, and a metadata area in which metadata and journaling data are stored.

The metadata may include, but is not limited to, location information (logical address, physical address, etc.) of the user data, the number of valid pages included in the memory block, which pages are valid in the memory block, and the like.

Journaling data is data that records the change history of the metadata. For example, when an unexpected problem such as a sudden power off (SPO) occurs, a state before the SPO occurs may be recovered or substantially recovered by referencing the journaling data.

The second memory device 300 may be a buffer memory, for example, a device based on a volatile memory (e.g., DRAM and SRAM), but is not limited thereto. Because the time for programming/reading data in the first memory device 100 is longer than the data communication time with the host, data processing can be accelerated by using the second memory device 300 having fast write/read times.

For example, when the host issues a command to store user data, the memory controller 200 generates metadata related to the command and stores the metadata in the metadata area of the second memory device 300. Alternatively, the memory controller 200 may update metadata related to the command, which is stored in the metadata area of the second memory device 300. The memory controller 200 generates the change history (generation/removal/update, etc.) of the metadata as journaling data.

When journaling data continues to be generated and the total size of the journaling data reaches a predetermined size, the memory controller 200 transfers the entire journaling data to the first memory device 100 (i.e., the metadata area in the first memory device 100).

The memory controller 200 may also transfer the metadata stored in the second memory device 300 to the first memory device 100 according to a preset logic/schedule. Because the size of the metadata is larger than the size of the journaling data, a long period of time may be required to transfer the entire metadata to the first memory device 100. Thus, for example, whenever the journaling data is transferred to the first memory device 100, some of the metadata may be transferred and written to the first memory device 100. Therefore, in a runtime state of the storage device, a portion of the metadata stored in the first memory device 100 may be up to date, and the other portion thereof may not be up to date.

Upon receiving a power-off signal from the host, the memory controller 200 transfers all the metadata and journaling data to the first memory device 100 to update the metadata/journaling data stored in the first memory device 100.

When the storage device is booted, the memory controller 200 loads metadata stored in the first memory device 100 into the second memory device 300. Further, the memory controller 200 updates (i.e., replays) the metadata using the journaling data.

The memory controller 200 includes an ECC engine 210. The ECC engine 210 performs an encoding operation on user data and/or metadata to generate parity data or parity bits. The ECC engine 210 performs an error correction operation on the read data using parity data.

The memory controller 200 also includes a journal controller 220. The journal controller 220 generates journaling data that records a change history of the metadata.

The metadata may be loaded into a plurality of sub-regions 310, 320 and 330 of the second memory device 300, and the metadata is updated (replayed) by using the journaling data.

Referring to FIG. 2, the metadata area of the second memory device 300 may include first sub-regions 310, 320 and 330 and a second region 390.

The first sub-regions 310, 320 and 330 may include any number of sub-regions, and the description of sub-regions 310, 320 and 330 is merely an example. For each of the sub-regions 310, 320 and 330, the ECC function may be turned on or off. That is, under the control of the ECC engine 210, the ECC function may be selectively turned on or off for data stored in each of the sub-regions 310, 320 and 330. The first regions 310, 320 and 330 are regions where the metadata is loaded/stored and replayed by the journaling data.

The second region 390 is a region where the ECC function remains on. That is, under the control of the ECC engine 210, the ECC function may remain turned on for data stored in the second region 390. The second region 390 may be a region allocated for a firmware operation. The description of sub-regions 310, 320 and 330, and the second region 390, is merely exemplary to distinguish the sub-regions 310, 320 and 330 from the second region 390. The second memory device may include any number of regions or sub-regions including at least one region or sub-region in which the ECC function may be selectively turned on or off and at least one region or sub-region in which the ECC function may be selectively maintained in an ON state (i.e., enabled).

Referring to FIG. 3, the ECC engine 210 includes an ECC controller 211, an ECC range controller 212, an ECC on/off controller 213, a parity generator 214, and the like.

The ECC controller 211 manages operations related to the error correction operation, and controls the ECC range controller 212, the ECC on/off controller 213, the parity generator 214, and the like.

The ECC range controller 212 divides and manages the second memory device 300 into a plurality of regions 310, 320, 330 and 390. In particular, the ECC range controller 212 divides and manages the sub-regions 310, 320 and 330 and the second region 390. The ECC range controller 212 may determine the size of each of the sub-regions 310, 320, 330 and 390 or adjust the size of each of the sub-regions 310, 320, 330 and 390.

The ECC on/off controller 213 selectively turns on/off the ECC function for each of the sub-regions 310, 320 and 330 of the second memory device 300. For example, the ECC functions of all of the sub-regions 310, 320 and 330 may be turned off. Alternatively, the ECC functions of only some of the sub-regions 310, 320 and 330 may be selectively turned off.

Specifically, during a booting operation (in particular, while the journal controller 220 updates the metadata using the journaling data), the ECC on/off controller 213 turns off the ECC functions of all of the sub-regions 310, 320 and 330.

After the booting operation, the ECC on/off controller 213 selectively changes the ECC functions of the sub-regions 310, 320 and 330 to an ON state. More specifically, after the booting operation, the parity data is generated for each of the sub-regions 310, 320 and 330 (by the parity generator 214), and the ECC on/off controller 213 changes the ECC function to the ON state for the sub-regions 310, 320 and 330 for which the parity data has been generated.

On the other hand, if necessary, during the booting operation (in particular, while the journal controller 220 updates the metadata using the journaling data), the ECC function may be turned on for some sub-regions (e.g., the sub-region 310), and the ECC function may be turned off for the remaining sub-regions (e.g., the sub-regions 320 and 330). In this configuration, after the booting operation, parity data may be generated only for the sub-regions (e.g., the sub-regions 320 and 330) in which the ECC function is turned off.

The parity generator 214 generates parity data with respect to data stored in each of the sub-regions 310, 320 and 330. The parity generator 214 may be implemented as hardware logic, but is not limited thereto.

The parity generator 214 may generate parity data in a predetermined order, for example, in the order of the first sub-region 310, the second sub-region 320, . . . , the $n^{th}$ sub-region 330, but the disclosure is not limited thereto.

Alternatively, the parity generator 214 may generate parity data according to a parity data generation request (or an access request for the sub-region 310) of data stored in the sub-region (e.g., the sub-region 310) of the host, but the disclosure is not limited thereto.

The on/off operation of the ECC function will be described in detail with reference to FIGS. 4 to 11.

Figure 4:
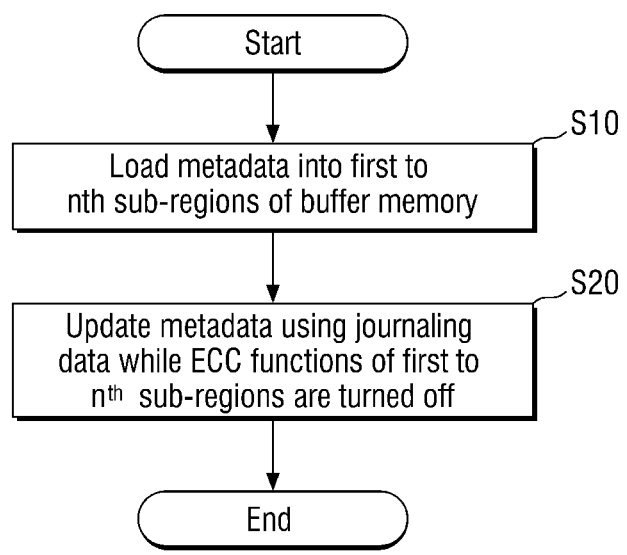
FIG. 4 is a flowchart illustrating an operating method of a memory controller according to an embodiment of the disclosure.
Figure 5:
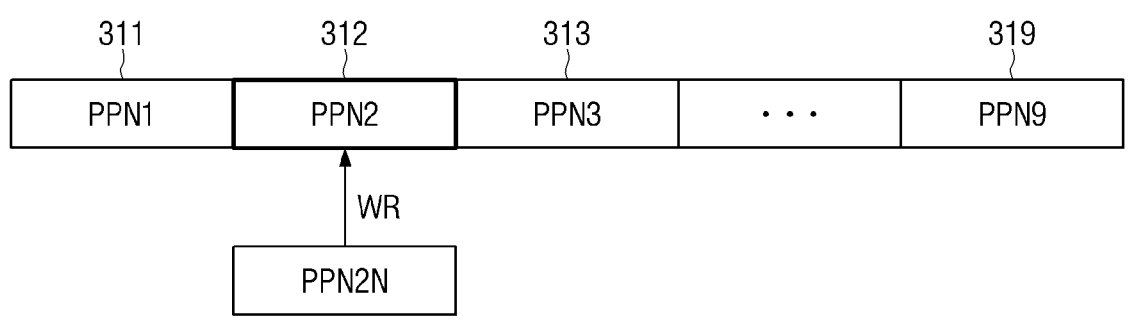
FIG. 5 is a diagram explaining a replay operation in a state that the ECC function is turned off.
Figure 6:
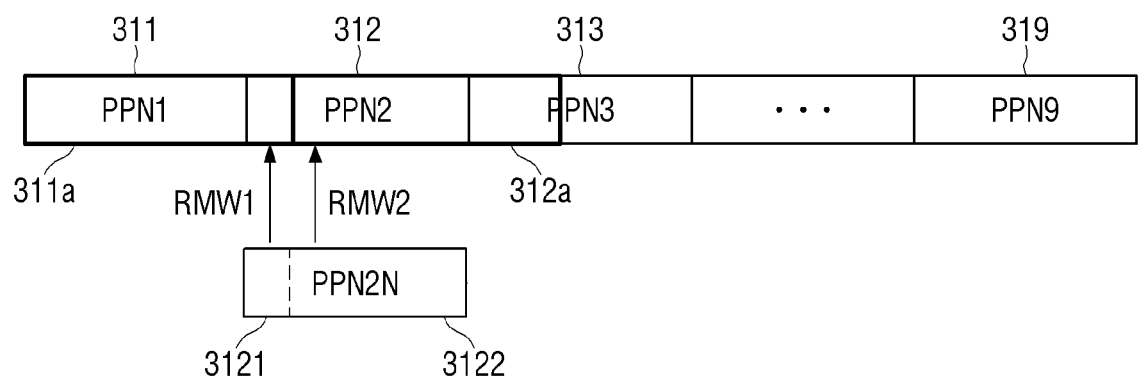

FIG. 4 is a flowchart illustrating an operating method of a memory controller according to an embodiment of the disclosure. FIG. 5 is a diagram explaining a replay operation in a state that the ECC function is turned off. FIG. 6 is a diagram explaining a replay operation in a state that the ECC function is turned on.

First, referring to FIG. 4, when the storage device is booted, metadata is loaded into the sub-regions 310, 320 and 330 of the second memory device 300 (i.e., the buffer memory) (step S10). The metadata is updated (replayed) using the journaling data in the state in which the ECC functions of the sub-regions 310, 320 and 330 are turned off (step S20).

For example, as shown in FIG. 5, each metadata 311, 312, 313, . . . to 319 is loaded into the second memory device 300 when the storage device is booted. For example, each metadata 311, 312, 313, . . . to 319 may be a physical page address (PPN), but the metadata is not limited thereto. For example, the size of each metadata may be 6 bytes, but the size of the metadata is not limited thereto.

Here, if the journaling data includes "change a physical address PPN2 described in the metadata 312 to a new physical address PPN2N," the existing physical address PPN2 should be changed to the new physical address PPN2N based on the journaling data at boot time. As described above, updating (or modifying) the metadata based on the contents described in the journaling data is referred to as "replay."

In the first embodiment of the disclosure, when performing the replay operation, in the state that the ECC function is turned off (i.e., an OFF state or disabled), a normal write operation is used, rather than a read-modification-write (RMW) operation. The RMW operation provides for reading previously stored data, comparing the read data with the data to be written, and writing only portions where the read data and the data to be written are different from each other. For example, if the read data is 1000 and the data to be written is 1001, only the last bit (a value of 1) is written. Unlike the RMW operation, the normal write operation provides for writing data to be immediately written without a read/compare operation. The normal write operation is faster than the RMW operation because there is no separate read/compare operation compared to the RMW operation.

Referring to FIG. 6, a case that the ECC function is turned on (i.e., an ON state) during the replay operation will be described. As in the above example, if the journaling data includes "change a physical address PPN2 described in the metadata 312 to a new physical address PPN2N," the existing physical address PPN2 should be changed to the new physical address PPN2N based on the journaling data at a time of booting or startup.

When the ECC function is turned on, parity data is generated for the metadata. Herein, the management size of metadata may be different from the management size of data for generating parity data. For example, as described above, the management size of metadata may be 6 bytes, and the management size of data for generating parity data may be 8 bytes.

In addition, when the ECC function is turned on, the replay operation may be performed using the RMW operation.

Therefore, in the example of FIG. 6, two write operations are required to change to the new physical address PPN2N. This is because a portion 3121 of the physical address PPN2N may be adjusted by changing data 311a, and the other portion 3122 of the physical address PPN2N may be adjusted by changing data 312a. As described above, if the management size of data for generating parity data is 8 bytes, a physical address PPN1 (i.e., 6 bytes) and a portion (i.e., 2 bytes) of the physical address PPN2 are read, a portion to be changed (i.e., a portion of the physical address PPN2) is changed to a portion 3121 of the physical address PPN2N, and parity data is generated by using the physical address PPN1 and the portion 3121 of the changed physical address PPN2N. Similarly, the other portion (i.e., 4 bytes) of the physical address PPN2 and a portion (i.e., 4 bytes) of a physical address PPN3 are read, and a portion to be changed (i.e., the other portion of the physical address PPN2) is changed to the other portion 3122 of the physical address PPN2N, and parity data is generated by using the other portion 3122 of the physical address PPN2N and a portion of the physical address PPN3.

Therefore, when the ECC function is turned on, a long period of time may be required to update the metadata based on the journaling data. That is, a time required to boot or complete startup may be excessively long.

Therefore, in the first embodiment, when performing the replay operation, the normal write operation is used instead of the RMW operation in the state that the ECC function is turned off. Accordingly, the time required for the replay operation at boot time can be minimized.

Figure 7:
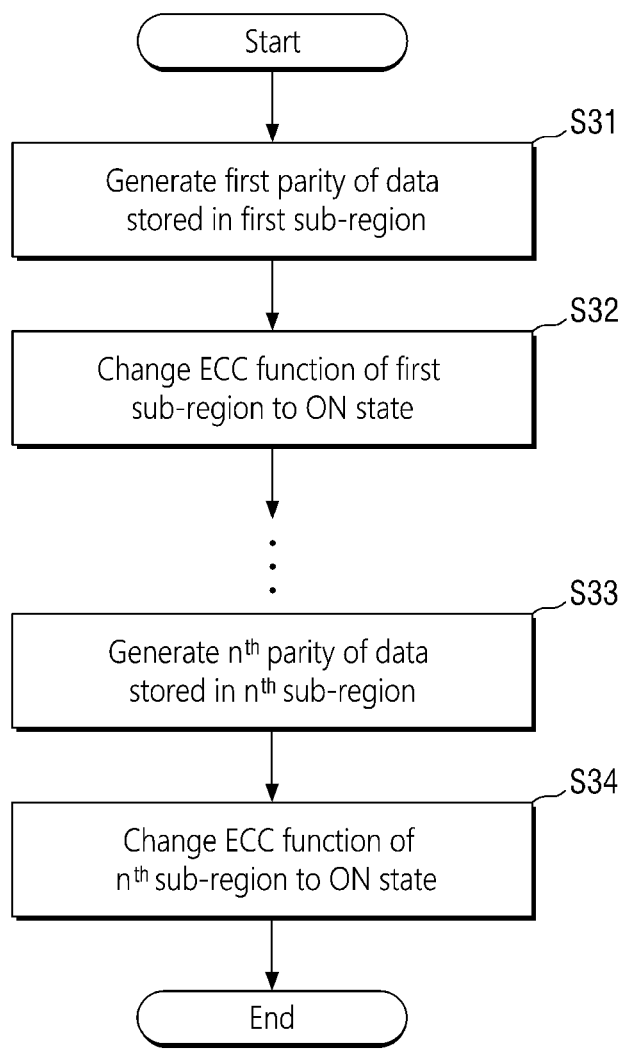
FIG. 7 is a flowchart illustrating a method of operating a memory controller according to an embodiment of the disclosure.

FIG. 7 is a flowchart illustrating a method of operating a memory controller according to an embodiment of the disclosure.

Because the replay operation of FIG. 4 is performed in the state that the ECC function is turned off, parity data is generated after the replay operation of FIG. 4 is completed.

Parity data may be generated in a predetermined order. For example, parity data may be generated in the order of the first sub-region 310 (see FIG. 2), the second sub-region 320 (see FIG. 2), . . . , the $n^{th}$ sub-region 330 (see FIG. 2). For simplicity of description, it is illustrated in FIG. 2 that the first sub-region 310, the second sub-region 320, . . . , and the $n^{th}$ sub-region 330 are disposed from top to bottom. Thus, it can be understood that parity data is generated from top to bottom, but the disclosure is not limited thereto.

Referring to FIG. 7, first parity data of data stored in the first sub-region 310 is generated (step S31). Then, the ECC function of the first sub-region 310 is changed to the ON state (step S32).

Further, second parity data of data stored in the second sub-region 320 may be generated. The ECC function of the second sub-region 320 may also be changed to the ON state.

Subsequently, $n^{th}$ parity data of data stored in the $n^{th}$ sub-region 330 is generated (step S33). The ECC function of the $n^{th}$ sub-region is changed to the ON state (step S34).

That is, after parity data is generated for each of the sub-regions 310, 320 and 330, the ECC function is changed to the ON state for the sub-regions 310, 320 and 330 for which parity data has been generated. In this manner, the host may access the sub-regions 310, 320 and 330 in which the ECC function is changed to the ON state, without the risk of data corruption.

In an alternative configuration, the ECC function to the ON state for all the sub-regions 310, 320 and 330 after the parity data of the data stored in all the sub-regions 310, 320 and 330 is generated. In this configuration, the first parity data of the data stored in the first sub-region 310 is generated, the second parity data of the data stored in the second sub-region 320 is generated, the $n^{th}$ parity data of the data stored in the $n^{th}$ sub-region 330 is generated, and the ECC functions of the first sub-region 310 to the $n^{th}$ sub-region 330 are turned on at once.

It is assumed that the host needs to access the second sub-region 320. According to the embodiment, after parity data is generated for the first sub-region 310 and the second sub-region 320, (even if no parity data is generated for the third sub-region 330) the host may access the second sub-region 320. However, in a comparative example, the host may access the second sub-region 320 only after generating the parity data for all the sub-regions 310, 320 and 330. Thus, according to the embodiment of the disclosure in which the ECC function is changed to the ON state for a sub-region after the parity data for that particular sub-region is generated, the host may have a relatively faster access to the sub-region (e.g., 320) for which parity data has been generated.

Generating parity data for each of the sub-regions 310, 320 and 330 may be performed as a background operation.

In addition, generating parity data for each of the sub-regions 310, 320 and 330 may be performed by hardware logic. When generating parity data is performed by hardware logic, parity data may be more quickly and more accurately generated than generating parity data in software.

In the case of generating parity data for each of the sub-regions 310, 320 and 330, and turning on the ECC function for each of the sub-regions 310, 320 and 330, additional benefits and advantages may be obtained.

For example, by using the metadata of the sub-region in which the ECC function is in an ON state, the consistency of the metadata of the sub-region in which the ECC function is in an OFF state may be easily determined. As described above, the metadata includes location information and also information such as the number of valid pages and identifiers or indications of those pages that are valid. For example, the metadata of the sub-region in which the ECC function is in an ON state may include information "five valid pages in the first memory block." However, when checking the metadata of the sub-region in which the ECC function is in the OFF state, if there are only four valid pages of the first memory block, the metadata of the sub-region in which the ECC function is in the OFF state is unreliable.

Figure 8:
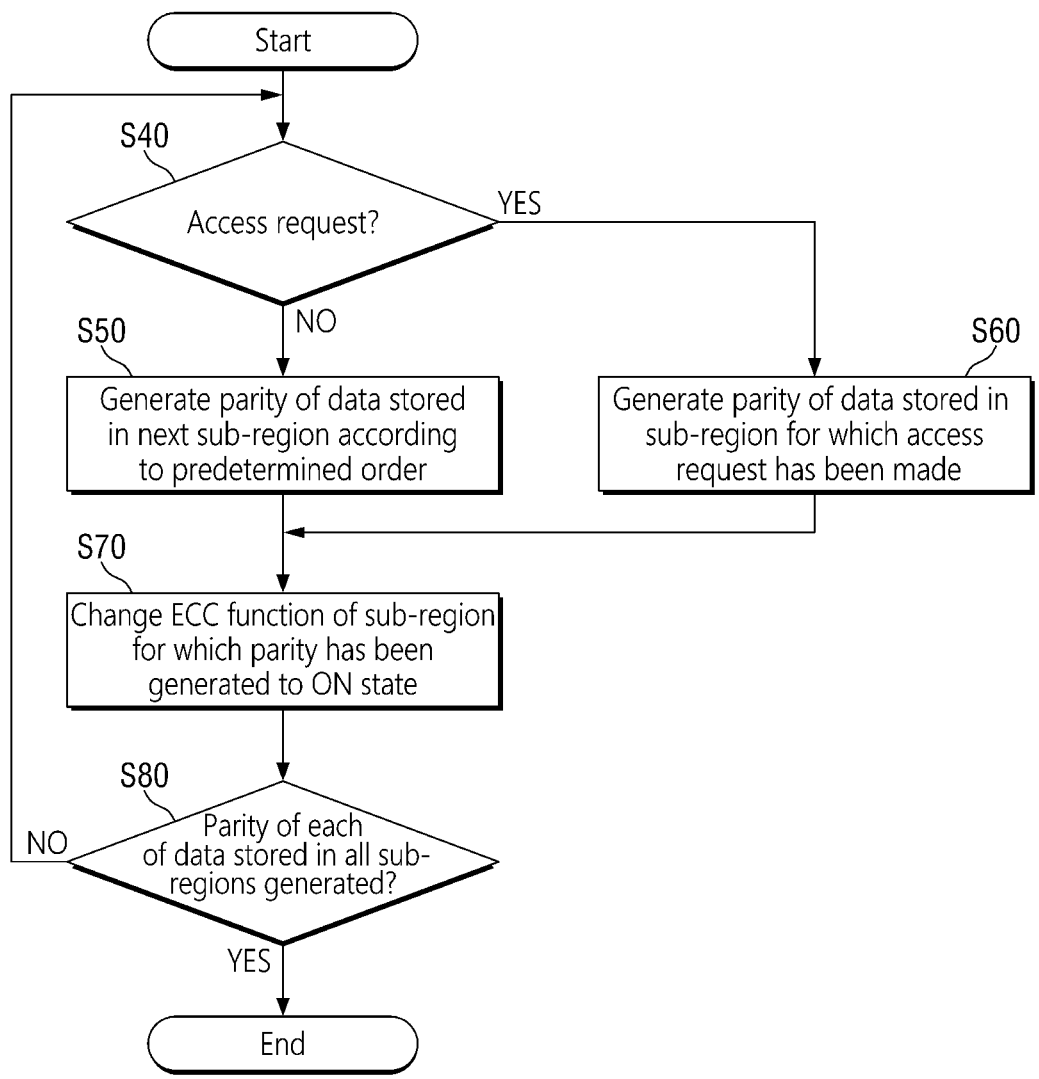
FIG. 8 is a flowchart illustrating a method of operating a memory controller according to an embodiment of the disclosure.

FIG. 8 is a flowchart illustrating a method of operating a memory controller according to an embodiment of the disclosure.

Because the replay operation of FIG. 4 is performed in the state that the ECC function is turned off, parity data is generated after the replay operation of FIG. 4 is completed.

Referring to FIG. 8, the host may query whether there is an access request for any one of the sub-regions 310, 320 and 330 of the second memory device 300 (step S40). If there is no access request (NO), parity data of data stored in the next sub-region is generated according to the predetermined order (step S50). If there is an access request (YES), parity data of data stored in the sub-region for which an access request has been received is generated (step S60).

Subsequently, the ECC function of the sub-region for which parity data has been generated is changed to the ON state (step S70).

Then, whether parity data of each of data stored in all the sub-regions has been generated may be determined (step S80). If parity data of each of data stored in all the sub-regions has not been generated (NO), the process returns to step S40 and the process is repeated for each of the sub-regions. If parity data of each of data stored in all the sub-regions has been generated (YES), the process ends.

For example, generating first parity data of data stored in the first sub-region 310 may be initialized.

If an access request does not occur from the host during the generation of the first parity data or until the completion of the generation of the first parity data, a second parity data of the data stored in the second sub-region 320 is generated according to the predetermined order (see steps S40 and S50).

On the other hand, during the generation of the first parity data or when the generation of the first parity data is completed, an access request for the $n^{th}$ sub-region 330 may occur from the host. In this case, unlike the predetermined order, an $n^{th}$ parity data of the data stored in the $n^{th}$ sub-region 330 rather than the second sub-region 320 is generated (see S40 and S60).

Here, even if an access request for the $n^{th}$ sub-region 330 occurs during the generation of the first parity data, the completion of the first parity data generation should be guaranteed. For example, even if an access request occurs, after the generation of the first parity data is completed, the generation of the $n^{th}$ parity data of data stored in the $n^{th}$ sub-region 330 may be started. Alternatively, when an access request occurs, the generation of the first parity data may be interrupted, and after the generation of the $n^{th}$ parity data of the data stored in the $n^{th}$ sub-region 330 is performed first, the interrupted generation of the first parity data may be resumed and completed.

In summary, the predetermined parity data generation order may be to generate the parity data in the order of the first sub-region 310 to the $n^{th}$ sub-region 330. Here, while generating an $m^{th}$ (m is a natural number between 1 and n−2) parity data of data stored in an $m^{th}$ sub-region, if a $k^{th}$ (k is a natural number between m+2 and n) parity data generation request (i.e., an access request for a $k^{th}$ sub-region) of data stored in the $k^{th}$ sub-region is received, after generating the $k^{th}$ parity data, an $(m+1)^{th}$ parity data of data stored in an $(m+1)^{th}$ sub-region may be generated.

For example, the second memory device may include ten sub-regions, and parity data should be generated in sequential order from the first sub-region to the tenth sub-region. Then, while generating a third parity data of data stored in the third sub-region, if there is a fifth parity data generation request (i.e., an access request for the fifth sub-region) of data stored in the fifth sub-region, fifth parity data is generated (before a fourth parity data is generated). After generating the fifth parity data, the fourth parity data is generated according to the order.

As described above, if there is a fifth parity data generation request, the generation of the third parity data may be interrupted, and after the fifth parity data is generated, the third parity data generation may be resumed. Thereafter, the fourth parity data may be generated according to the order.

Alternatively, if there is a fifth parity data generation request, the generation of the third parity data may be completed and the fifth parity data may be generated. Thereafter, the fourth parity data may be generated according to the order.

Figure 9:
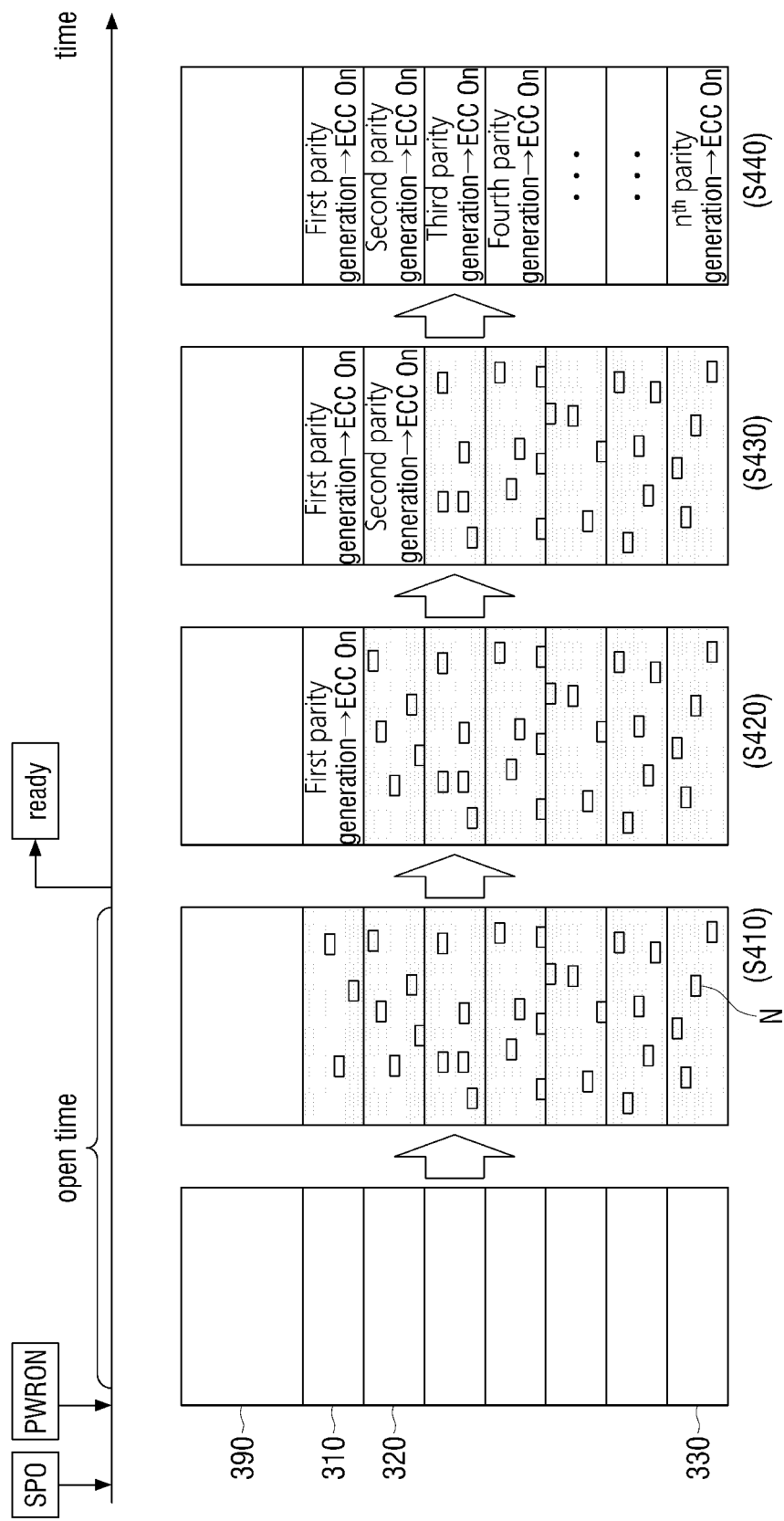
FIG. 9 is a diagram illustrating a method of operating a memory controller according to an embodiment of the disclosure.

FIG. 9 is a diagram illustrating a method of operating a memory controller according to an embodiment of the disclosure.

Referring to FIG. 9, first, a sudden power off (SPO) of the storage device occurs.

As described above, in the runtime state, metadata stored in the second memory device 300 (i.e., a volatile memory device) is frequently transferred to the first memory device 100 (i.e., a nonvolatile memory device). The journaling data related to the metadata is also transferred to the first memory device 100.

Because the SPO has occurred, the metadata/journaling data stored in the first memory device 100 may not be up to date.

When the storage device is powered on again (PWR ON), metadata is loaded into the first sub-region 310 to the $n^{th}$ sub-region 330 of the second memory device 300. In the state in which the ECC functions of the sub-regions are turned off, the metadata is updated (i.e., replayed) using the journaling data (step S410). The replay operation is performed by using the normal write operation instead of the RMW operation in the state that the ECC function is turned off. A portion indicated by N in FIG. 9 indicates the metadata updated using the journaling data.

When the replay operation is completed, the memory controller 200 transmits a ready signal to the host. The ready signal is a signal (i.e., a boot completion signal) indicating that the preparation is completed and the command can be executed. A period between the power-on time and the ready signal generation is referred to as "open time."

For some SSD products, there is a requirement for open time when SPO occurs. The larger the capacity of the SSD product, the larger the size of the metadata/journaling data. Thus, it becomes difficult to update the metadata according to the requirement (i.e., within a predetermined open time).

In the embodiment of the disclosure, when the replay operation is performed, because the normal write operation is used in the state that the ECC function is turned off, even if the capacity of the storage device increases or the size of the metadata/journaling data increases, updating of the metadata can be easily performed within the requirement (i.e., within the predetermined open time).

Thereafter, parity data may be generated in a predetermined order.

A first parity data of data stored in the first sub-region 310 is generated. Then, the ECC function of the first sub-region 310 is changed to the ON state (step S420).

Subsequently, a second parity data of data stored in the second sub-region 320 is generated. Then, the ECC function of the second sub-region 320 is changed to the ON state (step S430).

Subsequently, an $n^{th}$ parity data of data stored in the $n^{th}$ sub-region 330 is generated. The ECC function of the $n^{th}$ sub-region is changed to the ON state (step S440).

That is, after parity data is generated for each of the sub-regions 310, 320 and 330, the ECC function is changed to the ON state individually for the sub-regions 310, 320 and 330 for which parity data has been generated. In this manner, the host may immediately access the sub-regions 310, 320 and 330 in which the ECC function has been changed to the ON state, without the risk of data corruption.

Figure 10:
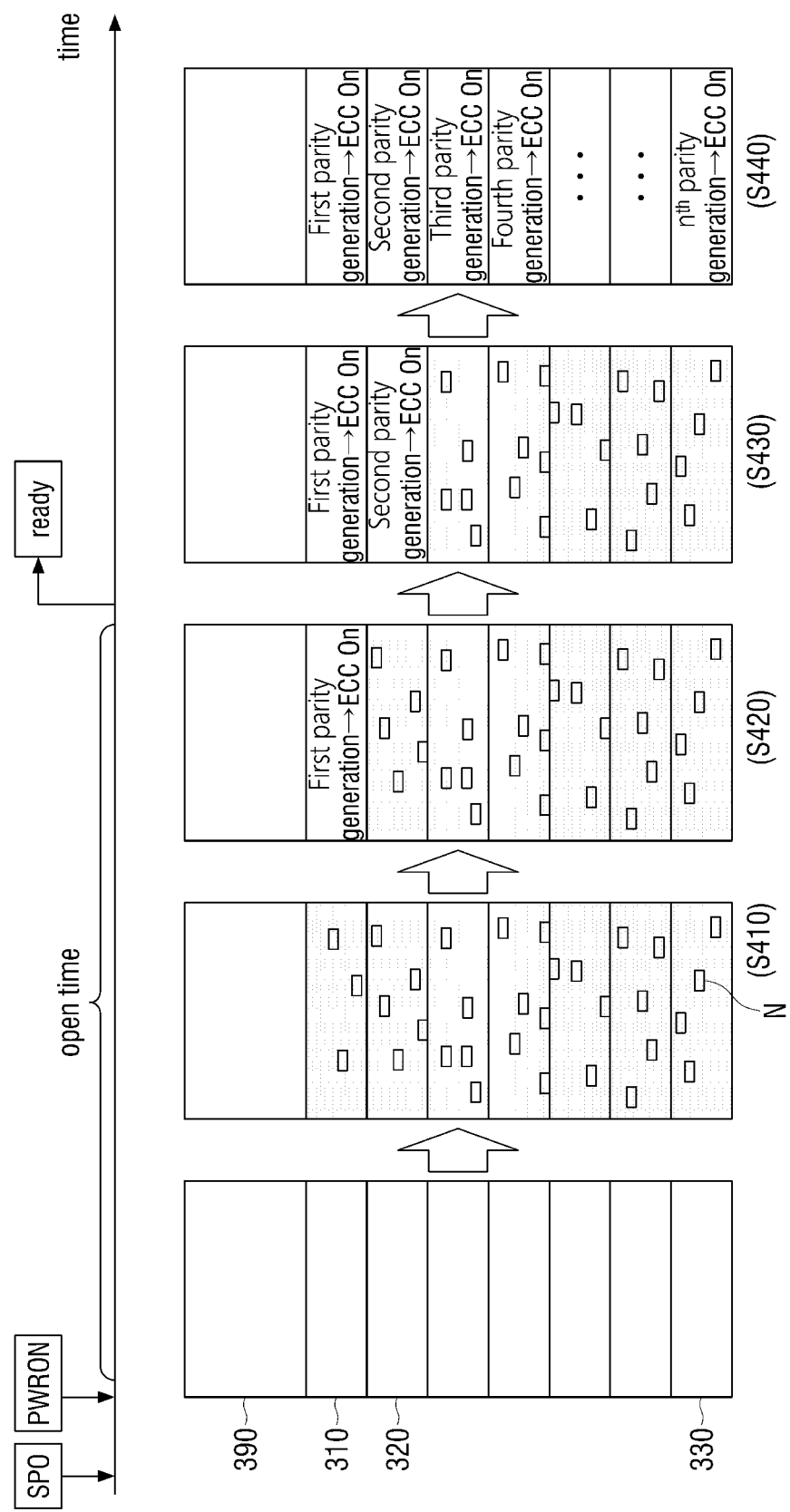
FIG. 10 is a diagram illustrating a method of operating a memory controller according to an embodiment of the disclosure.

FIG. 10 is a diagram illustrating a method of operating a memory controller according to an embodiment of the disclosure. For simplicity of description, the following description will focus on differences from the embodiment described with reference to FIG. 9.

Referring to FIG. 10, a sudden power off (SPO) of the storage device occurs.

When the storage device is powered on again (PWR ON), metadata is loaded into the first sub-region 310 to the $n^{th}$ sub-region 330 of the second memory device 300. In the state that the ECC functions of the sub-regions are turned off, the metadata is updated (i.e., replayed) using the normal write operation (step S410). A portion indicated by N in FIG. 10 indicates the metadata updated using the journaling data.

However, because the normal write operation is used in the state that the ECC function is turned off, the replay operation may be completed considerably faster than the required SPO open time. Therefore, step S420 of generating parity data of data stored in some sub-regions (e.g., the first sub-region 310), and changing the ECC function of the sub-region 310 for which parity data has been generated to the ON state may be performed within the SPO open time.

In this way, while satisfying the requirement related to the SPO open time, the replay operation can be performed as soon as possible, and the risk of data corruption can be reduced for some sub-regions (e.g., the sub-region 310).

Thereafter, the memory controller 200 transmits a ready signal to the host.

The parity data generation is performed on the remaining sub-regions 320 and 330 in a predetermined order. That is, a second parity data of data stored in the second sub-region 320 is generated. Then, the ECC function of the second sub-region 320 is changed to the ON state (step S430). Subsequently, an $n^{th}$ parity data of data stored in the $n^{th}$ sub-region 330 is generated. The ECC function of the $n^{th}$ sub-region is changed to the ON state (step S440).

Figure 11:
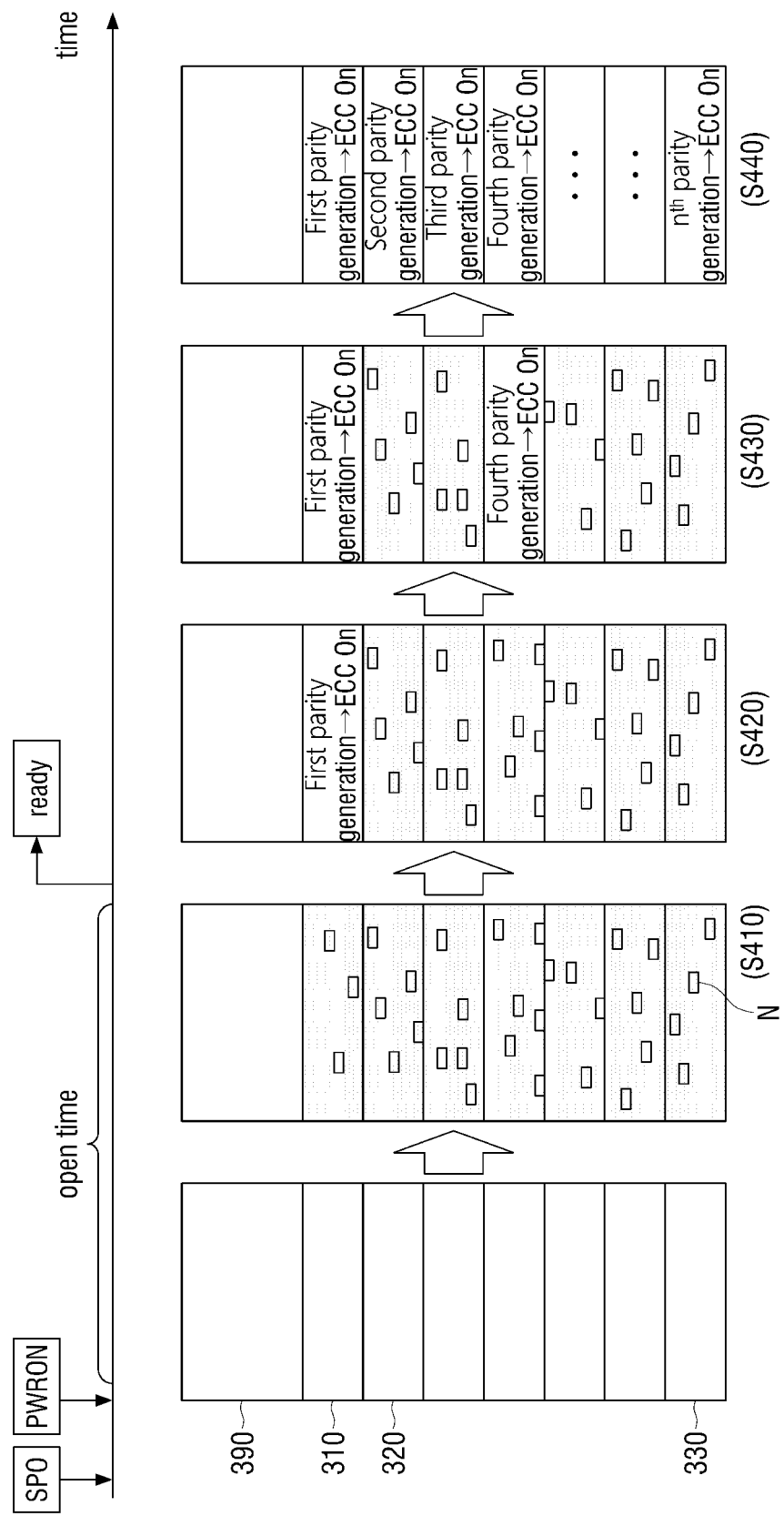
FIG. 11 is a diagram illustrating a method of operating a memory controller according to an embodiment of the disclosure.

FIG. 11 is a diagram illustrating a method of operating a memory controller according to an embodiment of the disclosure. For simplicity of description, the following description will focus on differences from the embodiment described with reference to FIGS. 9 and 10.

Referring to FIG. 11, a sudden power off (SPO) of the storage device occurs.

When the storage device is powered on again (PWR ON), metadata is loaded into the first sub-region 310 to the $n^{th}$ sub-region 330 of the second memory device 300. In the state that the ECC functions of the sub-regions are turned off, the metadata is updated (i.e., replayed) using the normal write operation (step S410). A portion indicated by N in FIG. 11 indicates the metadata updated using the journaling data.

Thereafter, parity data may be generated in a predetermined order.

A first parity data of data stored in the first sub-region 310 is generated. Then, the ECC function of the first sub-region 310 is changed to the ON state (step S420).

In this configuration, a fourth parity data generation request (i.e., an access request for the fourth sub-region) of data stored in the fourth sub-region may be received from the host. A fourth parity data is generated (before the second parity data is generated). Then, the ECC function of the fourth sub-region is changed to the ON state (step S431).

After generating the fourth parity data, the second parity data of data stored in the second sub-region is generated again according to the order. Subsequently, an $n^{th}$ parity data of data stored in the $n^{th}$ sub-region 330 is generated. The ECC function of the $n^{th}$ sub-region is changed to the ON state (step S440).

In concluding the detailed description, those skilled in the art will appreciate that many variations and modifications may be made to the preferred embodiments without substantially departing from the principles of the inventive concepts herein. Therefore, the disclosed preferred embodiments of the disclosure are used in a generic and descriptive sense only and not for purposes of limitation.

What is claimed is:

1. A method of operating a memory controller, the method comprising:
   loading metadata for restoring a state of a memory to a state before a sudden power off (SPO), into a plurality of sub-regions of a buffer memory;
   updating the metadata for restoring the state of the memory to the state before sudden power off (SPO) using journaling data that records a change history of the metadata, the updating being performed in a state that an error correction code (ECC) function of the memory controller is disabled for each of the plurality of sub-regions;
   generating a first parity data of data stored in a first sub-region among the plurality of sub-regions; and
   enabling the ECC function of the first sub-region, after generating the first parity data.

2. The method of claim 1, wherein the updating of the metadata using the journaling data is performed within an open time of sudden power off (SPO) of the buffer memory, and
   wherein the generating of the first parity data is performed after the open time of the SPO.

3. The method of claim 1, further comprising:
   generating second parity data of data stored in a second sub-region among the plurality of sub-regions, after generating the first parity data; and
   enabling the ECC function of the second sub-region, after generating the second parity data.

4. The method of claim 3, wherein the updating of the metadata using the journaling data and the generating of the first parity data are performed within an open time of SPO of the buffer memory, and
   wherein the generating of the second parity data is performed after the open time of the SPO.

5. The method of claim 1, wherein the generating of the first parity data is performed as a background operation.

6. The method of claim 1, further comprising generating parity data of data respectively stored in the plurality of sub-regions in an order of the plurality of sub-regions arranged in the buffer memory.

7. The method of claim 6, wherein the plurality of sub-regions comprises n sub-regions (n is a natural number of 2 or more), and
   wherein the method further comprises:
   while generating $m^{th}$ (m is a natural number between 1 and n−2) parity data of $m^{th}$ data stored in an $m^{th}$ sub-region among the plurality of sub-regions, if a $k^{th}$ (k is a natural number between m+2 and n) parity data generation request of $k_{th}$ data stored in a $k^{th}$ sub-region among the plurality of sub-regions is received, after completing the $k^{th}$ parity generation request, generating an $(m+1)^{th}$ parity data of $(m+1)^{th}$ data stored in an $(m+1)^{th}$ sub-region among the plurality of sub-regions.

8. The method of claim 6, wherein the generating comprises generating the parity data by hardware logic.

9. The method of claim 1, wherein the updating of the metadata using the journaling data comprises a normal write operation rather than a read-modification-write (RMW) operation.

10. A method of operating a memory controller, the method comprising:
   loading metadata for restoring a state of a memory to a state before sudden power off (SPO), into a plurality of sub-regions of a buffer memory during an open time of sudden power off (SPO) of the buffer memory,
   updating the metadata for restoring the state of the memory to the state before sudden power off (SPO), using journaling data that records a change history of the metadata, the updating being performed in a state that an error correction code (ECC) function of the memory controller is disabled for each of the plurality of sub-regions; and
   after the open time of the SPO, as a background operation, generating parity data of data respectively stored in the plurality of sub-regions in an order of the plurality of sub-regions arranged in the buffer memory.

11. The method of claim 10, wherein the plurality of sub-regions comprises n sub-regions (n is a natural number of 2 or more), and
   wherein the method further comprises:
   while generating $m^{th}$ (m is a natural number between 1 and n−2) parity data of $m^{th}$ data stored in an $m^{th}$ sub-region among the plurality of sub-regions, if a $k^{th}$ (k is a natural number between m+2 and n) parity data generation request of $k^{th}$ data stored in a $k^{th}$ sub-region among the plurality of sub-regions is received, after completing the $k^{th}$ parity generation request, generating an $(m+1)^{th}$ parity data of $(m+1)^{th}$ data stored in an $(m+1)^{th}$ sub-region among the plurality of sub-regions.

12. The method of claim 10, further comprising:
   after generating first parity data of a first sub-region among the plurality of sub-regions, enabling the ECC function of the first sub-region; and
   after generating $n^{th}$ parity data of an $n^{th}$ sub-region (n is a natural number of 2 or more) among the plurality of sub-regions, enabling the ECC function of the $n^{th}$ sub-region.

13. The method of claim 10, wherein the updating of the metadata using the journaling data comprises a normal write operation rather than a read-modification-write (RMW) operation.

14. A storage device comprising:
   a main memory;
   a buffer memory comprising a plurality of sub-regions; and
   a memory controller configured to load metadata for restoring a state of the buffer memory to a state before sudden power off (SPO) that is stored in the main memory, into the plurality of sub-regions of the buffer memory after a sudden power off (SPO) of the buffer memory occurs, and update the metadata for restoring the state of the buffer memory to the state before sudden power off (SPO), using a journaling data that records a change history of the metadata, the metadata being updated according to whether an ECC function of the memory controller for each of the plurality of sub-regions was selectively enabled or disabled by the memory controller upon the SPO of the buffer memory.

15. The storage device of claim 14, wherein the memory controller is further configured to, while updating the metadata using the journaling data, disable the ECC function for all sub-regions of the plurality of sub-regions.

16. The storage device of claim 15, wherein the memory controller is further configured to, after updating the metadata using the journaling data, generate parity data of data stored in each sub-region of the plurality of sub-regions, and enable the ECC function only for processed sub-regions among the plurality of sub-regions for which the parity data has been generated.

17. The storage device of claim 16, wherein the memory controller is further configured to check consistency of metadata of a sub-region among the plurality of sub-regions in which the ECC function is disabled using metadata of a sub-region among the plurality of sub-regions in which the ECC function is enabled.

18. The storage device of claim 14, wherein the memory controller is further configured to, after updating the metadata using the journaling data, generate parity data of data stored in each sub-region among the plurality of sub-regions by using hardware logic.

19. The storage device of claim 14, wherein the memory controller is further configured to, while updating the metadata using the journaling data, enable the ECC function only for processed sub-regions among the plurality of sub-regions for which parity data has been generated, and disable the ECC function for sub-regions among the plurality of sub-regions for which the parity data has not been generated.

* * * * *